July 4, 1967
L. G. KAPLAN
3,329,246
REVERSIBLE VISCOUS SHEAR COUPLING
Filed Oct. 24, 1965
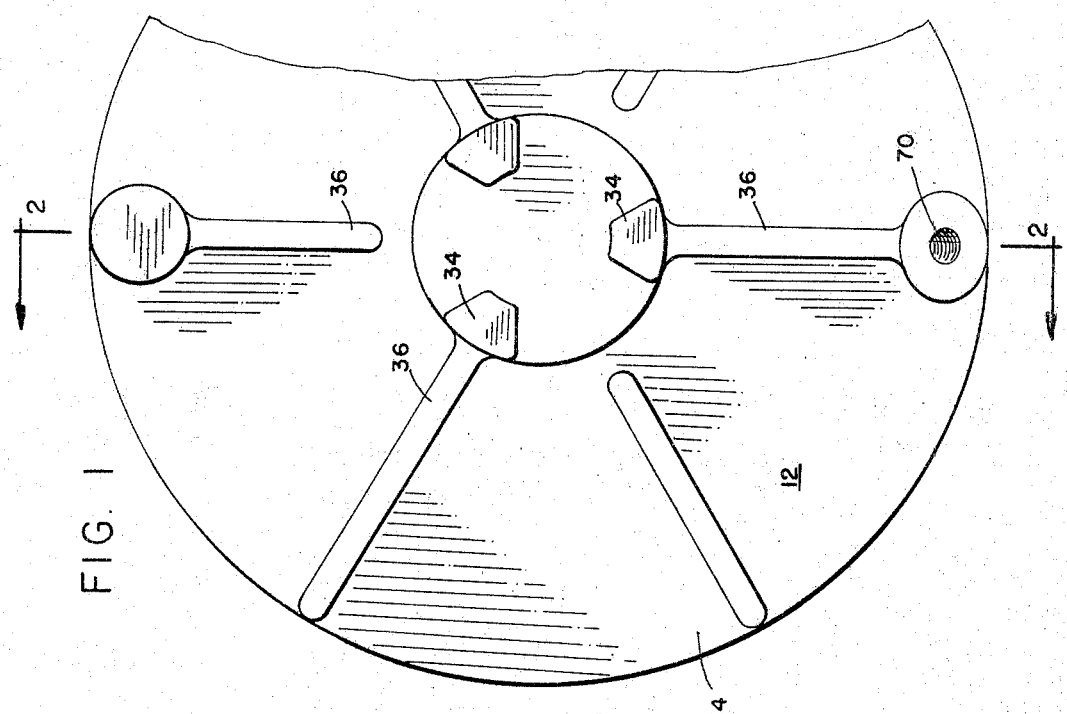
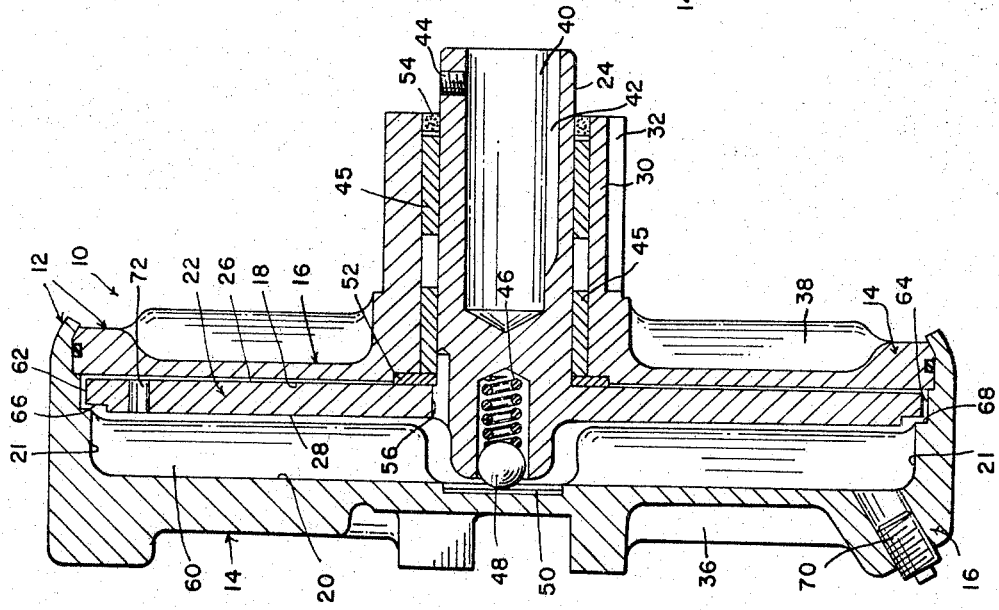
INVENTOR:
LOUIS G. KAPLAN
BY: Edward R. Lowndes 3,329,246
REVERSIBLE VISCOUS SHEAR COUPLING
Louis G. Kaplan, 306 Darrow St.,
Evanston, Ill. 60202
Filed Oct. 24, 1965, Ser. No. 504,946
6 Claims. (Cl. 192—58)

ABSTRACT OF THE DISCLOSURE

A reversible viscous shear coupling for general power transmission use. An inner rotatable member is enclosed in a relatively rotatable housing and presents an annular surface in viscous shear relationship to an opposing annular surface within the housing. The side of the inner member remote from the two working surfaces establishes, in combination with the opposed inner face of the housing a negligible shear fluid reservoir and a series of vanes on either the inner member or the housing impel the fluid in the reservoir and cause it to travel with the member on which the vanes are disposed.

The present invention relates to a viscous shear coupling of the type wherein torque is transmitted from one terminal member to another terminal member under the influence of the shear characteristics of a fluid. More specifically, the invention is concerned with a novel coupling which, without any modification whatsoever, is capable of reverse operation, which is to say that either terminal member may be employed as an input member, in which case the other terminal member will become effective as the output member, the choice of members for functional purposes being predicated upon two different modes of operation of which the coupling is capable.

According to the present invention, the coupling is so designed that when one of the terminal members is employed as an output member, maximum torque will be developed through the coupling under conditions of stalling of the other member. Conversely, when the other terminal member is selected as an input member, only a moderate amount of torque will be developed through the coupling and an appreciable amount of slip will occur, thus preventing damage to the coupling parts, as well as to the prime mover which, in the case of an electric motor, would otherwise be subjected to deleterious loading. In either event, the coupling of the present invention relies upon the action of centrifugal force to compensate for variations in speed differentials between the driving and the driven member and serves, in one instance, to facilitate the acceleration of inertia loads and to tolerate output stalling, and in the other instance, to deliver high torque at reduced output speeds, even to the point of complete stall. Also, in either event, provision is made for effective heat dissipation so that prolonged conditions of stall with either high or low power output, as the case may be, may be attained.

Briefly, the invention contemplates the provision of a shear coupling in which the two terminal members thereof present, each to the other, two pairs of opposed shear surfaces. One pair of shear surfaces establishes a high shear working area or zone and the other pair establishes a negligible shear fluid storage zone. During operation of the coupling where one terminal member constitutes the input or driving member, an increase in the relative speed of rotation between the two members causes a centrifugal flow of fluid from the high shear working zone to the negligible shear storage zone, thus decreasing the transmission of torque. When the other terminal member constitutes the input member, this centrifugal flow is reversed so that fluid flows from the storage zone into the high shear zone, thus increasing the transmission of torque.

The provision of a viscous shear coupling of the character briefly outlined above and possessing the stated advantages constitutes the principal object of the present invention. Numerous other objects and advantages, not at this time enumerated, will become readily apparent as the nature of the invention is better understood.

In the accompanying single sheet of drawings forming a part of this specification, one illustrative embodiment of the invention has been shown.

In these drawings:

FIG. 1 is a fragmentary end view of a viscous shear coupling embodying the principles of the present invention; and FIG. 2 is a sectional view taken substantially along the line 2—2 of FIG. 1.

Referring now to the drawings in detail, the viscous shear coupling of the present invention has been designated in its entirety at 10 and it involves in its general organization a rotatable housing 12 which is comprised of two housing sections 14 and 16 suitably secured together in fluid tight relationship to define therebetween an internal annular cavity presenting internal end faces 18 and 20 and a generally cylindrical peripheral wall surface 21. A circular disk 22, carried by a shaft 24 coaxial with the housing 12, is rotatable within the cavity and presents opposite side faces 26 and 28 which oppose the end faces 18 and 20 respectively. According to one mode of operation of the coupling, the shaft 24 and its associated disk 22 may constitute the driving member of the coupling while the housing 12 may constitute the driven member thereof. According to another mode of operation, the housing may constitute the driving member while the shaft and disk may constitute the driven member. The two modes of operation of which the coupling is capable will be described in detail presently when the nature of the structure involved is better understood. For purposes of initial discussion herein, the shaft 24 and disk 22 will be regarded as being the driving member of the coupling.

The housing section 16 is formed with a tubular hub 30 having a spline groove for reception of a sheave 32 by means of which power may be applied to or taken from the housing 12, depending upon which mode of operation is in effect. Alternatively, a series of three lugs 34 (FIG. 1) on the housing section 14 constitute an element of a jaw type coupling device by means of which power may be applied to or taken from the housing 16. Radial fins 36 formed externally on the section 14 are provided for heat dissipating purposes as will be described presently. A series of similar fins 38 are formed externally on the housing section 16.

For power input purposes, the shaft 24 is formed with a relatively deep socket 40 having a spline groove 42 and a set screw arrangement 44 whereby the shaft may be fixedly and operatively connected to either a power input or a power take-off shaft (not shown).

The housing 12 may be supported by the shaft 24 through the media of antifriction bearings 45. The shaft and disk are yieldingly biased in one direction by a spring 46 acting through a ball 48 on a thrust plate 50. The consequent thrust is assimilated by a thrust bearing 52. This arrangement serves to establish the axial position of the disk 22 within the cavity defined by the opposed end faces 18 and 20. An oil seal 54 between the hub 30 and shaft 24 retains lubricant within the bearing 45. A series of circumferentially spaced bores 56 supply lubricant to the bearing 45.

A series of eight equally spaced internal radial fins 60 are formed on the end face 20 of the housing section 14, the thickness of these fins in the axial direction of the housing being such that they closely approach the side face 28 of the disk 22. The radial extent of these fins is substantially equal to the radial dimension of the cavity within the housing. The faces 26 and 18 of the disk 22 and housing section 16 respectively are disposed in close proximity to each other so that they define therebetween a high shear zone which to a large extent constitutes the working or torque-transmitting area of the coupling when the cavity is filled with a viscous fluid. This torque-transmitting area is augmented to a slight extent by the opposed cylindrical areas 62 and 64 on the disk and housing in the extreme peripheral regions thereof, and also by two opposed radial surfaces 66 and 68 on the disk and housing which are afforded by adjacent relieved areas on these two members.

A filler plug 70 is provided in the peripheral region of the housing section 14 for introduction of a predetermined quantity of the viscous fluid which may be a suitable silicon fluid having a high viscosity and chemical stability over a wide range of temperatures and also having good lubricating qualities.

A series of holes 72 which are disposed in circumferentially spaced relationship in the peripheral region of the disk 22 are provided for purposes of fluid short-circuiting in a manner and for a reason that will be made clear when the operation of the present viscous shear coupling is set forth.

Still considering the shaft 24 to be the input member of the coupling, with fluid in the cavity afforded by the housing 12 and in the required amount to satisfy the conditions about to be described, under idling conditions of little or no load upon the driven housing 12, the disk 22 and housing will rotate substantially in unison. Inasmuch as very little shearing action of the fluid between the two closely positioned surfaces 18 and 26 takes place, only a small and negligible amount of torque is transmitted from the disk to the housing. Upon an increase in the load on the housing 16, the rotative speed thereof decreases proportionately and this results in an increased shear action on the fluid existing between the opposed surfaces 18 and 26 in the high shear zone, thus allowing slippage between the disk and housing. This results in an increase in the amount of torque transmitted from the disk to the housing. The rate of torque increase is however not proportional to the amount of slippage inasmuch as the heat which is generated within the fluid involves an increase in the temperature thereof and a consequent decrease in the viscosity of the fluid. On the side of the disk 22 which opposes the surface 18, the rotative speed of fluid within the cavity will be roughly one-half the rotative speed differential between the two rotating units whereas, on the side of the disk opposing the surface 20 the rotative speed of the fluid will be substantially equal to the rotative speed of the output member, i.e. the housing 16, due to the confining action of the radial fins 60. The fluid on this side of the disk will therefore be carried bodily with the rotating housing 12.

As additional load is progressively applied to the output member or housing 12, resulting in a further decrease in the rotative speed thereof, the rotative speed of the fluid on the side of the disk 22 which opposes the surface 20 decreases proportionately and, as a consequence, the centrifugal force acting thereon is decreased to such a point that it is exceeded by the centrifugal force of the fluid in the narrow space between the opposed surfaces 26 and 18. Fluid will then flow radially outwardly in this latter space, pass around the periphery of the disk, and enter the relatively wide space existing between the opposed surfaces 20 and 28, thus decreasing the "radial fluid level" in the former space and increasing such fluid level in the latter space. This obviously results in a deficiency of fluid in the high shear zone or working area on one side of the disk 22 while only a slight increase in the negligible-shear, fluid storage zone on the opposite side of the disk takes place. This phenomenon results in the maintenance of a balancing of centrifugal forces so that an appreciable rise in the rate of torque transmission is effectively prevented.

It is within the purview of the present invention to omit the circumferentially arranged series of holes 72, in which case the conditions outlined above still will obtain. However, when the holes 72 are provided, a localized circulation of fluid in the form of an eddy current will take place, the fluid flowing from the high shear working zone, around the periphery of the disk and into the storage zone, and then back to the high shear working zone through the holes 72. This localized circulation has the effect of filling or replacing fluid in the high shear working zone to compensate for the fluid which has been purged therefrom under the influence of centrifugal force. The holes 72 thus serve to increase the torque capacity of the coupling, as also does the provision of the opposed radial faces 66 and 68 near the peripheral regions of the disk and housing. Throughout the entire range of operation of the coupling as set forth above, the rapidly rotating cooling fins 38 remain effective for heat dissipating purposes and the fins 36 are also effective but to a lesser degree.

The above described operation of the viscous shear coupling 10, utilizing the shaft 24 as the input member and the housing 12 as an output member, may briefly be summarized by stating that any increase in the relative speed of rotation between the driving and driven members will have the effect of driving fluid out of the high shear working area or zone on one side of the disk 22 and into the storage area or zone on the other side of the disk, thus inhibiting an increase in the amount of torque transmitted through the coupling. The radial disposition of the holes 72 in the disk 22, as well as the size thereof, controls to a large extent the amount of torque delivered when a condition of output stall is reached. The same is true insofar as the areas and spacing involved in connection with the opposed peripheral surfaces 66 and 68.

Considering now the housing 16 as the input member of the coupling and the shaft 24 as the output member, under idling conditions of little or no load upon the driven shaft 24, the disk 22 and housing 12 will, as previously described, rotate in substantial unison so that only a small amount of torque is transmitted through the coupling. As the load upon the shaft 24 is increased and the speed thereof decreases, the housing 12 continues to rotate at substantially rated speed so that the speed differential between the two rotating sections of the coupling increases. This causes a decrease of the rotative speed of the fluid between the closely disposed surfaces 18 and 26 and a consequent decrease in the centrifugal forces acting thereon. However, on the other side of the disk 22 the relatively wide vanes 60 continue to impel the fluid in the storage zone, thus subjecting it to full centrifugal force so that the same will flow around the periphery of the disk 22 and into the high shear working zone, thus increasing the transmission of torque from the disk to the housing. At such time as a condition of output stall may occur, maximum torque will be delivered through the coupling. During the entire range of operation of the coupling under the driving influence of the housing 12, the rapidly rotating cooling fins 36 will remain effective for heat-dissipating purposes.

From the above description it will be appreciated that when the shaft 24 is employed as the driving member of the coupling, the latter will be found useful for the acceleration of various inertia types of loads such as are encountered, for example, in connection with earth moving machinery and the like. Under conditions of complete output stall or at extremely low speeds, ample cooling is provided to prevent damage to the coupling. When the housing 12 is employed as the driving member, the coupling will be found useful in a situation where high torque at reduced output speeds is required. An example of one contemplated use is in connection with the rewinding of a web of material at constant web tension and speed.

For such use an oversize motor will be employed for input purposes and the coupling will deliver a substantially constant power output over an appreciable range of output speeds, thus producing uniform tension in the web during winding thereof.

It will be understood that the operating characteristics of the present viscous shear coupling may be varied by varying the quantity of fluid contained within the cavity of the housing 12. For example, if the coupling is operated so that the cavity is 90% full, substantially the entire working area afforded by the opposed surfaces 18 and 26 will be available for torque transmission through the coupling at low output speeds. On the other hand, if the coupling is operated with the cavity only 10% full, than only a small percentage of this working area will be available for torque transmission at low speeds.

The invention is not to be limited to the exact arrangement of parts shown in the accompanying drawings or described in this specification as various changes in the details of construction may be resorted to without departing from the spirit of the invention. For example, although in the illustrated form of coupling, the cavity within the housing 12 is shown as enclosing a single disk 22, it is within the scope of the present invention to utilize multiple disks operatively connected together for rotation in unison, each disk, in combination with its surroundings, establishing on one side thereof a high shear zone, and on the other side thereof a negligible shear or storage zone. Therefore, only insofar as the invention has particularly been pointed out in the accompanying claims is the same to be limited.

Having thus described the invention, what I claim and desire to secure by Letters Patent is:

1. In a viscous shear coupling of the character described, in combination, axially fixed driving and driven members relatively rotatable about a common axis, one of said members being in the form of a rigid housing defining an internal cavity enclosing the other member, the enclosed member being in the form of a disk having oppositely facing radial planar faces, the cavity being provided with radial planar faces spaced from and opposing the faces of the disk, the spacing between faces on one side of the disk being relatively small thus establishing a high shear working zone for a fluid in shear within the cavity, the spacing between faces on the other side of the disk being relatively great thus establishing a large volume, negigible shear storage zone for the fluid, said disk extending radially outwardly from the axis to a region close to but slightly spaced from the periphery of the cavity so as to define a continuous annular passageway between the two working zones through which fluid may pass in either direction from one zone to the other, depending upon an imbalance of centrifugal forces acting on the fluid in the two zones, and a series of fluid-impelling vanes on one of the members and projecting into and substantially across said large volume storage zone, said vanes constraining fluid in the latter zone to rotate in unison with one of said members.

2. In a viscous shear coupling, the combination set forth in claim 1, wherein said fluid-impelling vanes are disposed on the housing.

3. In a viscous shear coupling, the combination set forth in claim 2 and including, additionally, a series of radially extending heat-dissipating fins formed on said housing exteriorly thereof and in the vicinity of the planar face of the cavity which, in part, establishes said high shear working zone.

4. In a viscous shear coupling, the combination set forth in claim 2 and including, additionally, a series of radially extending heat-dissipating fins formed on said housing exteriorly thereof and in the vicinity of the planar face of the cavity which, in part, establishes said storage zone.

5. In a viscous shear coupling, the combination set forth in claim 1, wherein said disk is provided with a series of circumferentially spaced holes in the peripheral regions thereof, said holes establishing communication between said zones.

6. In a viscous shear coupling of the character described, in combination, axially fixed driving and driven members relatively rotatable about a common axis, one of said members being in the form of a rigid housing defining an internal cavity enclosing the other member, the enclosed member presenting a radial planar surface closely spaced from the radial planar surface of the enclosed member and, in combination therewith, establishing a high shear working zone for a fluid in shear within the cavity, the remaining portion of said cavity establishing a large volume, negligible-shear storage zone for the fluid, the enclosed member extending radially outwardly from the axis to a region close to but slightly spaced from the periphery of the cavity so as to define a continuous annular passageway in communication with both zones and through which fluid may pass in either direction between the zones, and a series of fluid-impelling vanes on one of the members and projecting into and substantially across said storage zone for constraining fluid in the latter zone to rotate in unison with said one member.

References Cited
UNITED STATES PATENTS

| | | | |
|---|---|---|---|
| 2,879,755 | 3/1959 | Weir | 192—58 X |
| 2,988,188 | 6/1961 | Tauschek | 192—58 X |
| 3,019,875 | 2/1962 | Fowler | 192—58 |
| 3,257,808 | 6/1966 | Kuiper | 192—58 X |
| 3,272,188 | 9/1966 | Sabat | 192—58 X |

MARK NEWMAN, *Primary Examiner.*

ARTHUR T. McKEON, *Examiner.*